United States Patent Office 3,311,483
Patented Mar. 28, 1967

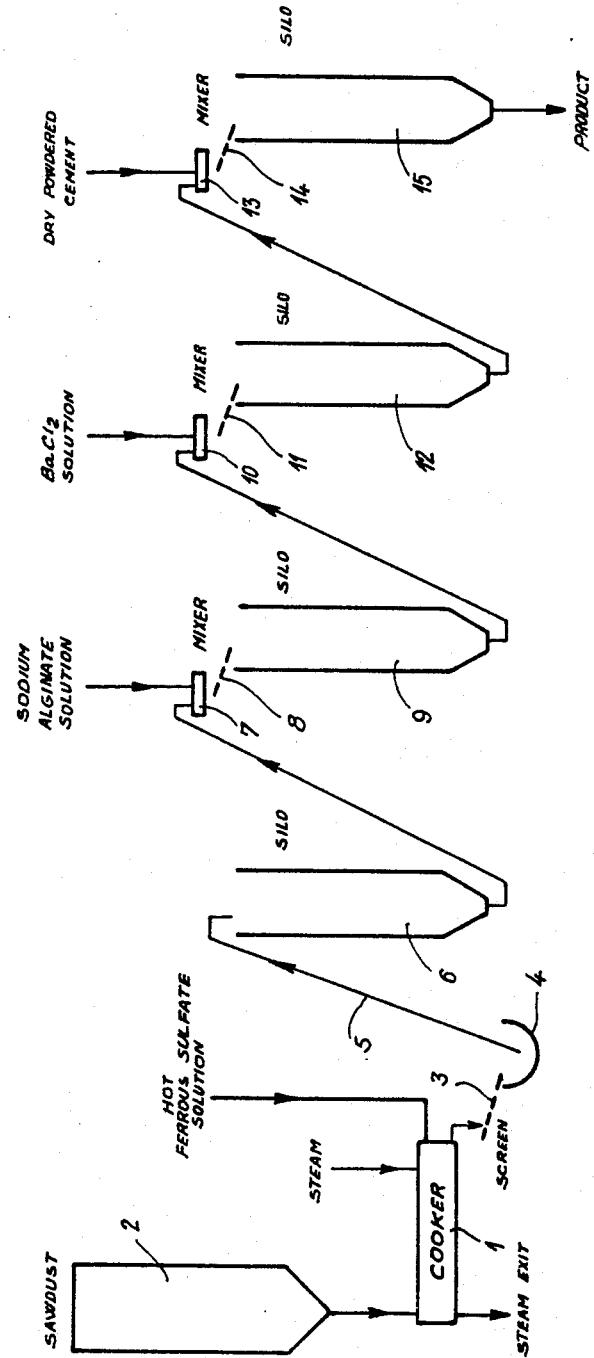

3,311,483
TREATING CELLULOSIC MATERIAL
Simone Garnier, 50 Rue de la Bidassoa, Paris, France, and Daniel Edouard Buntschu, Paris, France; said Buntschu assignor to said Garnier
Filed Aug. 26, 1963, Ser. No. 304,534
Claims priority, application France, Sept. 3, 1962, 908,491
14 Claims. (Cl. 106—93)

The present invention relates to a process for treating cellulosic material and to the novel industrial products obtained thereby, such as, for instance, additive and aggregate compounds for preparing mortar and concrete, insulating coatings, building mortar, finished, stable, light, carrier products, adapted to be used as heat-insulating means, fire-screens and the like.

The manufacture of agglomerates from wood waste (sawdust, fibres, shavings and the like) or from straw (such as reeds, corn, flax, rice straw and the like) is well known. According to the various processes of the prior art, the binding agent used is a polymerizable synthetic resin or a thermosetting impregnation material, a hydraulic binder or a magnesium cement (also known as "Sorel cement") and the like; the resulting product may be subjected to compression, to a thermal action or to both simultaneously, and the cellulosic material may be used alone or in conjunction with other natural or synthetic organic or mineral fillers.

When operating the agglomeration by means of a hydraulic binding agent, the previously known methods all advocate a careful sorting of the various kinds of wood, in order to remove the acid species such as beech, or the tannin-containing species such as oak, elm, larch, chestnut, and a screening operation for the rejection of small-size wastes. The agglomeration step which follows uses either large amounts of a binding material (75 to 200 litres of sawdust for 100 kg. cement) without preliminary treatment of the cellulosic particles, or using, when diluting, known additive components such as $BaCl_2$ or $CaCl_2$. A preliminary treatment of the sawdust may also be carried out for "mineralizing" the cellulosic particles, consisting in an extensive impregnation either in aqueous solutions of one or more alkaline-earth compounds, such as a 8–10% $CaCl_2$ solution, $BaCl_2$ solutions at 16° Baumé, sodium silicate and the like, or in alumina or heavy-metal sulfate solutions which may later be neutralized by salts such as barium salts or by means of bases, or still, at the time of mixing of the concrete or mortar, with formol, bisulfite lye and slaked lime. It is also known to boil sawdust in water and then after draining and washing with water, in a ferrous-sulfate solution, after which a high amount of lime is added.

The main disadvantage of the products obtained by means of these known techniques is an excessive hygroscopicity resulting in their undergoing substantial and continual variations in their dimensions changes to changes of the ambient conditions such as heat, humidity, wind and the like.

It has been found that only such processes which make use of barium chloride, either for impregnating the particles, or as an additive in the mixing step, will yield a final product presenting desirable mechanical properties (mortar gauge: 335 kg. cement per cubic meter).

All the hereinabove briefly mentioned processes however present serious drawbacks. In the first place, the impregnation agents or additives are very costly, and so are the methods applying the same. Moreover, the setting time of the mortar is long and irregular and the maturing and drying period of the mortar is also substantially long, exceeding 30 days unless a special autoclave treatment is resorted to; this latter step is essential for stabilizing the shrinkage and reduce the tendency to varying in dimension. Finally, the resulting products may only be prepared in the workshop; up to the present time, however, it was not possible to use conditions of preparation and utilization similar to those of conventional concrete when pouring wood based concrete into forms.

It is an object of the present invention to eliminate the above mentioned drawbacks of the conventional processes and to provide a method for treating cellulose which consists essentially in impregnating, preferably in the hot, the cellulosic material to be treated, with an aqueous solution of one or several metal salts for precipitating in situ the soluble constituents of said material, for instance a mixture of metallic sulfates containing, more particularly, an iron sulfate, and, if desired, in proceeding with a further impregnation by means of another metallic salt equally capable of forming a precipitate in situ by reacting with the cellulose and with the still free amount of metallic salt which was used in the first impregnation step, whereafter the cellulosic material thus treated is coated with alginic acid or with salts of alginic acid, preferably used in the form of gels, following which an aqueous solution of a calcium, barium or strontium salt, for instance $BaCl_2$, is incorporated to the resulting mass, and finally coating, if desired, the treated mass with a small amount of dry cement in powder form.

According to a preferred embodiment of the invention, the product resulting from the impregnation or from each impregnation is allowed to rest during a substantial period of time, preferably from a few hours to several days.

According to the invention, the first impregnation step is preferably carried out by means of an aqueous solution of ferrous sulfate, alone or in admixture with other metallic sulfates, such as copper or zinc sulfates.

The second impregnation may be effected with a powdered metal salt or in an aqueous solution of a metal salt.

As above mentioned, the impregnated cellulosic material may be directly coated with powdered alginic acid, without resorting to salts of said acid, or with alginates. The said alginates may be used alone or in admixture with suitable additives such as, for instance, fillers, activators, catalysts, dyes (soluble or insoluble pigments). Besides, the coating with alginates may also be carried out before the impregnation steps or therebetween, after adding the barium salt, for instance $BaCl_2$, or even after the coating with powdered cement.

It is another object of the invention to provide, as novel industrial products, the aggregates obtained from particles of resinous wood or of leafy wood (even of high tannin contents) or from any other cellulose form and which are manufactured by means of the process according to the invention; said aggregates being, moreover, adapted to be utilized either at the workshop, or on the work site, singly or in combination with conventional aggregates or with fillers.

Still another object of the invention is to provide concrete additives which are impermeabilizers, plasticizers, air-carriers and catalysts, being sawdust treated according to the above mentioned process; these additives may be admixed in any desired proportions with the aggregate or the binding agent, before the mortar or concrete mixing step. The invention also aims at providing mixtures of said aggregates with hydraulic or aerial binders, viz wood based mortars or concretes having improved properties, more particularly, a high simplicity of working or implementing, substantially no shrinkage upon drying and no dimension variations. Moreover, the wood based mortars and concretes according to the invention are impervious, heat insulating at high temperatures, slightly plastic and adapted to serve as fire screen. The products also possess high mechanical characteristics which enable them to be used as carrier elements; besides, they do not necessarily require any surface smoothing.

In particular, the concrete produced according to the invention may be subjected to pressure moulding, yielding products of high mechanical characteristics at a specific weight of about 1.4.

Moreover, the mixed concrete or mortar according to the invention may be employed in a particularly simple and useful way, since it may be poured into casings, reinforced, used as a masonry binder (thereby eliminating the thermal bridge), and applied as an ornamental or technical facing either by conventional or by mechanical methods, or by means of pneumatic spraying ("gun cement"). It may also be worked like wood, as by polishing, sawing, nailing, screwing; finally, the material may also be ground, beaded or crimped and chamfered or bevelled.

According to a further desirable feature of the invention, the present process enables the mixing to be carried out in hot water, at temperatures exceeding 50° C., thus enabling a very fast setting and the removal from the mould three to four hours after pouring: this avoids, in the prefabricating technique, the use of high-cost heating moulds.

The process according to this invention was developed after systematic investigations carried out in relation with the inhibitive power of wood affecting the setting, crystallization and hardening characteristics of hydraulic binders.

It was found that after having completely exhausted, by lixiviation in boiling water, the various water soluble constituents of wood, the sawdust treated still showed a substantial inhibitive effect on the setting and more particularly on the hardening of cement, and that immediately upon mixing of the concrete or mortar a chemical action of the binding agent on the various constituents of the wood developed.

Thus, all known processes where sawdust is treated by a base, and specifically by lime, or such processes which do not provide for effectively isolating the cellulose particles from the cement, yield a hygroscopic and dimensionally unstable product.

It has been found after a series of tests that in order to obtain a fast-setting wood based concrete, having desirable mechanical properties, the cellulosic material should be waterproofed rather than mineralized, and to provide a chemical binding whereby the cellulose particles form an integral part of the concrete and do not solely behave as a filler. Finally a neutralizing agent should be incorporated in one of the phases of the concrete, which is adapted to react with such concrete-inhibiting bodies as might still occur in the free state.

The invention will now be explained in greater detail, taken in conjunction with examples illustrating its various applications and how the same may be performed.

According to an embodiment of the impregnation step in the method according to the invention, the cellulosic material is cleared off its smaller fragments by preliminary screening and left to soak, in bulk or in containers formed of a fine wire gauze, in an aqueous metal sulfate solution, having a concentration ranging from 0.25 to 10% of sulfate, and, preferably from 0.5 to 4%, by weight. The impregnation may be carried out at room temperature and may last from 5 to 24 hours; it was found however that a treatment effected at a higher temperature (from 70° to 100° C.) provided a more complete reaction between the solution and the cellulosic material and allowed the soluble constituents of the material to be more readily dissolved; this hot treatment enables the soaking time to be reduced to 45–150 minutes. The soaking time may be further reduced and the osmotic interchanges activated by applying to the solution a pervibration of the order of 100 to 1000 c/s., or more.

According to a particular embodiment of the impregnation applied in this process, the cellulosic material is worked with a solution of ferrous sulfate in amounts varying from 0.75 to 0.15 litre of solution per 1 litre of sawdust.

After completing the impregnation, the treated mass is drained of its water over a wire gauze, the said draining may be, if required, promoted mechanically or by centrifugation, but it is readily effected when the impregnation has been carried out in the hot. The amount of solution retained by the cellulosic material should not exceed 200 to 220 g. per litre of the product obtained.

When the draining is completed, the mass is worked with a colloidal gel of alginates, having a concentration such that from 80 to 125 g. per litre of impregnated and drained cellulose are present.

It has surprisingly been found that a substantial ejection of liquid then occurs which often exceeds the mass of alginate gel which has been used; this liquid phase readily separates and requires no further draining. It has also been found that the operation is desirably effected while the drained cellulosic material is at a temperature comprised between 30 and 50° C. The operation may however also be carried out in the cold.

After the rejection of the liquid, the mixing of the mass is resumed, by incorporating thereto step by step an aqueous solution of a calcium, barium or strontium salt, in the proportion of 80 to 140 cubic cm. per litre of the starting material. Surprisingly, a further ejection of clear liquid occurs, which readily separates from the mass.

The cellulosic material thus prepared is then ready, as such, if it is desired to use it immediately, to be mixed with a hydraulic or aerial binding agent.

If it is desired to use it with cement, the proportions to be used are preferably 50 kg. of cement for 100 to 250 litres of the mass treated by the process of the invention, according with the physical characteristics and the setting time desired; an excellent result is obtained by using 50 kg. cement for 120 to 150 litres of aggregate, which proportions correspond to a conventional concrete.

The dilution is preferably carried out in a vertical mixer with forced mixing, but it is also possible to operate in a trough or in an ordinary concrete mixer. Should the humidity contents of the treated mass be unsufficient, small amounts of water may be added, the concrete tending to fluidify by itself after a few seconds of mixing.

After mixing, the concrete may be moulded in forms of any shape, according to the finally desired use: it may also be applied as a coating or as a masonry binder.

In addition, the cellulosic product treated according to the invention may be stored, bagged and delivered to the users to be employed as a conventional aggregate. It is desirable in this case to leave it to drain off so as to substantially reduce its apparent humidity contents, but, in accordance with a particular feature of the invention, the product may be mixed and completely drained with a small proportion of dry, powdered cement (from $\frac{1}{50}$ to $\frac{1}{10}$ in volume). Surprisingly, the cement may then mix perfectly and form, without any flocculation on the sawdust, a continuous film on its surface, a temperature rise occurring which promotes the drying of the cellulosic particles and the surface setting of the coating cement which completely mineralizes the sawdust.

According to a further feature of the invention, the cellulose material treated may be artificially dried, without being drained, so as to keep up an excess of the salts dissolved in the various solutions.

The cellulosic material thus treated also provides an additive for preparing hydraulically bonded mortars and concretes. It has been found that the addition of the treated sawdust in the proportion of $\frac{1}{100}$ to $\frac{1}{2}$ by weight and, preferably, $\frac{1}{50}$ to $\frac{1}{10}$ by weight of the binder, either to the aggregate or to the binder, before mixing the mortar or concrete with conventional aggregates, yielded an excellent additive having air-carrying, waterproofing, deflocculating and plasticizing properties: the fluidity and the cohesion of the water and cement mixture are thus increased. The best results have been obtained by adding a slight amount of a hydraulic or aerial binder.

It has also been found that in this case applying a coating of dry cement on the sawdust, in the proportion of 1/80 to 1/30 by weight, and preferably 1/60 to 1/50 by weight, produced an additive which has a marked action on the setting and on the crystallizing and hardening properties of the cement. More particularly, at the time of mixing, the said additive behaves like an air-carrier, thus enabling to reduce the amount of water required for a good workability of the mortar or concrete.

It is also within the scope of the invention to cause the cell particles to absorb or adsorb, at any time of the preparatory treatment, additives or chemical compounds the presence of which will be such as to modify, physically or chemically, the structure, the behaviour, the aspect, the density etc. of the material, either during tempering, or during the setting or subsequently thereto.

These compounds may be dye materials, fluosilicates and the like. Other compounds may be added, such as a powdered alginate or alginic acid, or furthermore a powder of a product such as bentonite which swells up by absorption of water; the use of such an additive gives rise to an infinity of minute cells formed of the water-swelled element which, little by little, surrenders this water to the concrete proper during and after the setting thereof, thus forming empty cells.

This process enables to substantially reduce the apparent density of the conventional concrete and increases markedly the heat insulating qualities thereof.

Independently of its additive qualities, the sawdust as treated by the process of the invention provides as above stated an excellent aggregate which may be mixed with a binder, either in the workshop or on the working location, in a proportion per volume of the aggregate ranging from 1 to 5 per 1 volume of cement, the amount of water involved being substantially from ½ to ⅔ of the weight of cement utilized in the case of the mean proportion of 3 volumes of aggregate per 1 volume of cement. Thus, a light concrete will be obtained, the characteristics of which are, after 28 days, as follows—

Specific gravity: 1 to 1.1
Compression strength: 130 to 160 kg./sq. cm.
Tensile strength: 30 to 45 kg./sq. cm.
λ:0.14
Life of the 6 cm.-thick fire-screen: 3 hours
Low acoustic conductivity
Not subject to frost-crack According to a preferred embodiment of the invention, the cellulose particles are soaked, during 80 minutes, in an aqueous solution of iron sulfate at a temperature over 80° C. The said solution is preferably prepared with commercial-grade ferrous sulfate, in the proportion of 2 to 4% by weight of the amount of water, titrating from 2° to 4° Baumé at 15° C. when measured with the acidimeter. Before starting the impregnation process, it is desirable, in order to activate the reactions, to adjust the starting pH of this pure solution so as to reduce it to a value ranging from 3.5 to 6.

The cellulosic particles readily absorb the solution up to the point of saturation owing to the osmotic interchanges and to the various chemical reactions, the pores of each fibre particle thus being partly filled up through the presence of precipitates within the said particles and on the surface thereof.

At the end of the process, the pH of the solution is comprised between 3 and 4.

This solution may be re-used with advantage, after adjustment of its ferrous sulfate contents, for treating other cellulose particles; it has, besides, been found that a solution, after a first utilization, possessed an activating power on the actions and reactions developed during the dipping of the cellulose particles in the sulfate bath. The ferrous-sulfate contents of said mother-solution must then be adjusted after having served, and the volume must be completed with fresh solution titrating 2° to 4° Bé. at a temperature of 15° C., to compensate for the amount of solution absorbed by the cellulose during the dipping; this method confers to the soaking bath a greater active power.

According to the same preferred embodiment, the impregnated cellulose mass is then drained by gravity to clear it from the excess liquid, which is recovered. The draining is effected quickly, and according to the masses involved and to the draining method selected, this operation requires from 15 to 70 minutes. The sawdust may desirably be packed to activate the draining.

After the draining operation, the amount of the solution tied up in the sawdust varies from 250 to 500 grams per litre of the initially handled sawdust, the preferred proportion ranging from 300 to 400 grams, according to the nature and the quality of the cellulosic material involved. The pH is then adjusted and lowered to substantially 4.

Again according to the same preferred embodiment of the invention, the mass thus drained is then mixed with a solution containing from 0.3 to 2% sodium alginate, and preferably from 0.5 to 1% of the latter, and having a viscosity, at 15° C., of 100 to 200 centipoises, 1 litre of said solution being employed with amounts of the drained mass varying from 3 to 20 litres, according to the characteristics of impermeabilization and of the workability reinforcement of the desired concrete; preferably, however, 1 litre of the alginate solution should be used for amounts of the drained mass comprised between 6 and 10 litres. A quantity of liquid generally exceeding the volume of the alginates treated will then separate spontaneously from the mass. This liquid may be collected and serve as an additive for preparing conventional mortar and concrete, as well as light concretes with cellulosic or mineral aggregates.

The alginates react with the unreacted ferrous sulfate and form a colloidal iron alginate.

Another portion of the alginates reacts with some constituents which still remain free, such as phenols, tannins and the like and forms therewith, as well as with the components already constituted with the ferrous sulfate, extremely complex alginates, some of which precipitate on the spot, while others gellify.

Although the present invention is not concerned with the very complex chemical reactions proper which occur during the above mentioned treatments, it has been found that ferrous hydroxide and nascent iron were developed. The formation in situ of these latter compounds is very important. They have an important catalytic action on the concrete and improve the mechanical characteristics of the wood based concrete.

Still in accordance with said preferred embodiment of the invention, the mass treated with alginates is then mixed with a barium chloride solution titrating from 15 to 30° Bé., at 15° C., and may, if required, be increased by 1 to 5° Bé. by adding calicum chloride (preferably, a 22° Bé.-solution will be used, the titre of which is raised to 25° Bé., at 15° C., by means of an addition of calcium chloride). One litre of this solution is used for amounts of the treated mass ranging from 5 to 15 litres (and preferably 1 litre of pure solution per 8 to 11 litres). The proportions are determined conveniently as a function of the quality of the wood, of the diversities of origin of the cellulosic materials and of the desired result. It is again surprising to note that a rapid segregation of the mass takes place, the ejected amount of liquid being such as to exceed in some cases the amount of the $BaCl_2$-solution fed during the mixing operation.

The liquid thus ejected may also serve as a valuable additive to the tempering water of the concrete materials.

The addition of the mixed solution of $BaCl_2$ and $CaCl_2$ to the treated mass again results in a series of chemical reactions, some of which are highly complex.

In particular, with the ferrous sulfate which may have remained free, $BaCl_2$ forms iron chlorid, which is known to have fungicidal properties and a practically insoluble barium sulfate, thereafter the $SO_3$-ion does not occur any more in the soluble form.

Since the $BaCl_2$ concentration is high, it causes in addition, the impregnation of the cellulosic fibres and the fixation of Ba values on said fibres.

According to an alternative embodiment of the invention, $BaCl_2$ may in the same conditions as above be substituted by a saturated barium or strontium hydroxide solution, or mixed with any salt of said compounds in powdered form and in an intimate contact with the mass to be treated (carbonates, oxides, sulfides, the oxides giving rise to a highly exothermic reaction).

Finally, and according to the same preferred embodiment of the invention, the cellulose mass thus treated is left to drain by gravity, so as to be cleared of any solutions spontaneously rejected during the two last previous operations. It has been found that during the said draining the chemical operations continued, and this, the more rapidly as the mass was at a temperature exceeding room temperature.

After the said last draining operation, the cellulosic mass may be used for producing a wood concrete, by mixing it with a quantity of cement fixed as a function of the desired product and varying from 1 volume of cement for volumes of the aggregate ranging from 1 to 5, and preferably 3. If the paste is too dry, a small amount of water or of one of the liquids rejected during the two last draining operations should be added by small quantities, in order to obtain the desired consistency.

It has also been found that the addition of a small quantity of said cellulosic mass treated according to the above described process, to sand or gravel used in a conventional concrete, allowed the flocculation effect of the cement to be reduced during the feeding thereof to the mixer and to diminish the amount of water required for the mixing, increasing the workability of the mortar thus obtained and rendering the concrete waterproof and resistant to aggressive agents. The proportion of material to be incorporated varies from one volume of the mass for 5 volumes of the mineral aggregate involved (below the latter proportion, the concrete obtained may be considered as forming a mortar based on a mixed mineral and cellulosic aggregate) to one volume of the mass for 60 volumes of the aggregate used. These preferred proportions should however not be considered as limitative and depend, in particular, on the specific surface of the mineral aggregate considered, on the characteristics of the cement employed and on the qualities desired both for mixing purposes and in the final product.

According to a further desirable feature of the process of the invention, a small amount of dry powdered cement is added to the treated cellulosic mass, after its having undergone a perfect draining, either by means of a mechanical draining, e.g. through pressure or through centrifugation, or through electro-osmose or by any other adequate means. It has been surprisingly found that the said cement, even when added in bulk without being sprinkled on the treated material, does not tend to flocculate and that, on the contrary, it readily tends to spread over the total surface of each aggregate particle. The mixing with said cement may be effected by stirring, kneading, or powdering on a vibratory belt. The amount of cement to be added varies from 1 volume of cement for 6 to 50 volumes of aggregate, to preferably 1 volume of cement for 15 to 30 volumes of aggregate.

A substantial temperature increase is then noticed inside the mass. It should however be noted that in the process of the invention said temperature rise is considerably less marked than if the powdering was effected on a fresh mass of green-wood sawdust, of water moistened sawdust or of sawdust treated in the usual manner with barium, calcium etc. chloride, followed if necessary by a powdering operation of a mineral material which is inert towards the cement, such as, for instance, iron oxide.

It has also been found that said temperature rise was directly proportional with the amount of the treated cellulosic mass, whereas the proportion of cement introduced during said operation affected only very slightly the quantity of heat released.

The apparent pH of the treated mass, i.e. the external pH of the cellulosic particles increases from 4 to 11, while acid vapours are released, between pH 3 and pH 5.

New excessively complex chemical reactions then occur. More particularly, a calcium alginate is produced which further reinforces the insulation and waterproofing of each cellulose particle and imparts it a true external mineralization.

Physically, an apparent desiccation of the treated mass will result, said mass then having the aspect of a coarse, granular dried powder.

According to yet another embodiment of the invention, and after causing the material to be treated with alginates, it is not treated with an alkaline-earth salt, but is used directly as an aggregate for a barium or strontium cement, or, simply, a coating is effected as in the preferred embodiment, by applying one of said cements in powdered form, the ultimate mixing being effected with a hydraulic binder, of the same composition or of a conventional type.

Other compounds may be used, having the properties of aerial or hydraulic binders or of puzzolana cement, such as lime, plaster, flying ashes, slag powder from blast furnaces, pummice, puzzolana and the like, to serve as coatings for the particles, instead of the conventional cement, or serve, if necessary as additives.

The material obtained by means of the process according to the invention forms a semi-finished stable product, which may be stored in silos or in bags, to be used when necessary.

It has besides been found that a certain degree of maturing occurred during this storage, but that the ageing only improves the qualities of the finished product.

Said semi-finished product constitutes a stable aggregate, to be used specifically for preparing both light, semi-light and heavy concrete materials.

As above mentioned said aggregate is mixed in a mixer, preferably of the horizontal-drum type, with an artificial Portland cement in proportions varying from 1 volume of cement for 2 to 4 volumes of the aggregate, and, preferably, for 3 volumes of the aggregate. After a quick mixing in the dry state, resulting in a homogeneous mixture, the necessary amount of water for mixing is added or, in certain cases, the liquid rejected during one of the two last draining stages. The proportions of the liquid required for mixing purposes is generally comprised between ½ and ⅔ of the quantity of cement involved; the mixing is readily effected and the paste obtained is of a highly plastic nature.

Before bagging or when proceeding to mortar preparation, the resulting aggregate according to the invention may be mixed in any desired proportions:

With sand or gravel to form a mixed motar,

With products such as polystyrene granules, polyurethane, polyvinyl foams and the like, in the form of the expanded products thereof, in order to further increase its insulating qualities by improving its lightness;

With granulated vermiculite, for preparing a long lasting high-temperature insulating material and fire-screening material lasting a long time, With any of the mineral fillers, of any desired granular size, capable of partaking or not partaking in the cohesion of the final product.

The motor obtained by means of the process of the invention may be utilized immediately; it may also be stored in containers, or, preferably, on a slightly inclined area, during 10 to 90 minutes.

A perfectly clear liquid then flows from the paste, without carrying along the grout of the cement; the said liquid is highly basic (pH=10).

The starting of the setting of the mortar takes place between 2 and 5 hours, the end of the setting, between 6 and 24 hours, according to the cement contents of the mixture, and the room temperature.

The final product obtained according to the above described method may have a final appearance which varies widely in accordance with the use and the surface treatment to which it is subjected.

When moulding, a very accurate reproduction of the texture of the mould or of the framework is obtained on the surface of the material. In particular, a material of which the setting was produced on a perfectly polished surface and treated by an anti-adhering agent, had an actual mirror-polish.

Other aspect qualities may be obtained by spraying, when using the material as a coating:

By a brushing operation using a hard brush, during the setting,

By brushing with a metal brush, after setting,

By scraping or roughing or by any other known means for the surface treatment of mineral-aggregate concretes (rough rolling etc.).

Moreover, the material according to the process of the invention may have its surface clean-treated by grinding or polishing.

Various surface aspects may be obtained by using different granular sizes in the aggregates, by varying the nature of the cellulose species which, as is known, provide widely different colours, without resorting, as usual, to a colouring operation of the aggregates. Marble-like appearances may thus be obtained.

According to a feature of the invention, it is however also possible to produce a mixture of variously coloured aggregates, or else obtain the desired colour effect by a coating with alginate gels including pigment substances; besides, grey or white cement may also be differently coloured.

When moulding elements in the workshop or on the spot, the material may be reinforced by means of the conventional metal reinforcements. There is however advantage in causing the latter to be subjected to a bonderizing or parkerizing operation, or to coat them by means of a brush, or by a mechanical or pneumatic spraying, or by dipping in a bath, with a slopping coating, either of pure cement, or of lime and cement mixture (the hydraulic binder grout may include a chrome salt), ensuring a perfect adherence with the reinforcements.

According to another embodiment of the invention, the material may be reinforced by reinforcements of vegetal origin, such as beams, wood lathings, straw, reed, jute cloth and other textile fabrics, or by means of mineral reinforcements, such as fiber-glass cloth, rock cloth, "nylon" cloth or other synthetic products.

The finished product may also be submitted to a surface treatment known per se, adapted to improve the qualities thereof, such as a silicating or sulphur treatment.

Moreover, the aggregate obtainer after treating the cellulosic material according to the invention may be used not only with the usual known hydraulic binders, but also with magnesium cement ("Sorel cement"), white lime or hydraulic lime or plaster.

The process of the invention is illustrated in the following examples, which should however not be considered as limitative of the applications thereof:

*Example 1*

In a 200 litres tank, an amount of 6 kg. of commercial ferrous sulfate (so called "snow" sulfate) was diluted with 150 litres of water. The said solution titrated 2° Bé., at a temperature of 15° C.

A mixture of sawdust material was added to the above solution derived from leafy and resinous wood species and dry bark wastes having the following composition—

Common or white pine sawdust: 25 l. weighing 3.800 kg.
Common (horse chestnut) sawdust: 25 l. weighing 4.440 kg.
Oak sawdust: 25 l. weighing 4.690 kg.
Bark wastes and fibres: 25 l. weighing 4.450 kg.

The mixture was then heated, the temperature being raised—and maintained during one hour—to 80° C., i.e. substantialy at the boiling point. Two stirring operations were effected during this interval of time. The impregnation was completed when the total mass collected on the bottom of the tank, except a few fragments and dust particles which were removed from the surface. It was then considered that the osmotic interchanges were sufficiently developed.

The solution was then drawn-off through a valve located at the lower portion of the tank, and carrying, at its inner side, a metallic filter.

The draining was readily effected and was further accelerated by ramming the mass by means of a block. The quantity of liquid rejected in one half hour was 106 litres.

Upon the mass being uniformly cooled down, at a temperature lower than 30° C., it was stirred with 16.5 litres of a 0.5% sodium alginate solution (such as the product known under the trademark "Nouraltex" marketed by Nourylande of Venette, near Compiègne (Oise) France) having a viscosity of 200 cp. at +20° C. Owing to the high film-producing power of this solution, a quick stirring operation of the mass— of a few minutes—was sufficient for the mass to be uniformly distributed over the surface of each particle.

A draining step was again necessary, promoted by exercising a slight compression: a clear liquid, of an amount of 18 litres, was then collected.

The mass was then left to rest during one hour, stirred again and 15 l. of a chloride of barium solution at 21° Bé. where then added, at a temperature of 15° C., and raised to 23° Bé. by the adjunction of calcium chloride.

A further draining resulted in the rejection of 18 litres of liquid.

The cellulosic mass was then placed in a mixer of the horizontal-drum type; the volume contained was 135 litres, weighing 58,800 kg. During the mixing process, 6.5 litres of artificial slag Portland cement (such as that marketed under the trademark "COQ" by Poliet et Chausson, Paris, France) were added, weighing 7,200 kg. The mixing was readily carried out, owing to the good dispersion quality of said cement and to the absence of flocculation, thus enabling each particle of the cellulosic mass to be completely covered up.

The mass thus treated was placed on a flat space, and an increase in temperature of the order of 20° C. occurred. When the overall temperature reached 35° C., the cellulosic product treated was uniformly distributed in a fine layer covering the flat space, whereupon it was left to dry naturally during 48 hours.

After this period of time, the product was found to be dry and provided an excellent aggregate. Pending its use, the product was packed in paper bags for storing. The weight of the finished product, for a volume of 114 litres, was 46,700 kg.

*Example 2.—Manufacture of concrete*

45 litres of the aggregate prepared as described in Example 1, and weighing 16,650 kg. were put aside and mixed, in the dry state, in a horizontal-drum type mixer with 15 litres of slag-containing Artificial Portland Cement (A.P.C.)(225–350 French Standard: NF VP 15–309), weighing 17,250 kg. When the aggregate-cement mixture was perfectly homogeneous, 16,500 litres of water were added. As soon as formed the curdled mass progressively fluidified, yielding an unctuous, homogeneous and firm mass.

The mortar thus prepared was placed in carefully lubricated metallic moulds, corresponding to the desired shape of the final products; the said placing of the mortar was carried out carefully with a trowel so as to confer the maximum compactness to the mass. The upper face of the moulded mortar was also carefully surfaced with a smoothing trowel.

The setting began 2 hours after the mixing and was completed 7 hours thereafter.

Withdrawing from the mould followed 12 hours after the manufacture, yielding a total volume of 39,700 litres of concrete blocks having a total weight of 50,840 kg.

After a period of 28 days from the date of manufacture, the samples taken from the concrete showed the following characteristics—

Specific gravity: 1.5
Compressive strength: 156 kg./sq. cm.
Tensile strength: 43 kg./sq. cm.

*Example 3*

This example in which reference is made to the appended drawing which is a diagram of the corresponding apparatus, relates to a practical embodiment of the invention, involving a semi-continuous process of manufacture of treated sawdust. A rotary cooker 1, was used, formed of a metal cylinder having an axial length of 8 m. and a diameter of 2.20 m., rotating about its longitudinal axis and the inside volume of which was separated in 8 compartments by means of partitions arranged in such a manner that, at each rotation of the cylinder, sawdust being introduced at one end and a solution of ferrous sulfate at the other, fixed screens separate the solid particles from the liquid phase, roughly drain the said particles which are transferred through a sluice to the next compartment whereas the liquid is transferred by means of a deflector into the preceding compartment. Such a type of cooker, working according to the countercurrent principle, is well known and need not be further described nor shown in detail. A low-pressure steam flow, at 110° C., was circulated through said cooker to maintain therein a temperature approximating 100° C.

Every 15 minutes, 250 litres of fresh resinous sawdust, collected at a saw-mill, were fed from a hopper 2 to said cooker, at the other end of which a solution of 7 kg. of commercial iron sulfate in 175 litres of boiling water were also poured every 15 minutes. The sawdust was thus successively washed, then drained, in a series of baths, the last of which being formed by the purest and most concentrated sulfate solution. The eight dipping draining operations were found to markedly improve the treatment as described in Example 1.

On leaving the equipment, the sawdust was poured onto a vibratory screen 3, which led the sawdust into a recovery container 4. It was found that the fresh sawdust treated did not change its volume, each batch, after draining, still representing 250 litres.

The sawdust was then transferred by a lifting device 5, such as a screw or spiral conveyor, and discharged into a vertical cylindrical silo 6 of 60 cubic meters. After a rest of over 24 hours, the sawdust was continuously withdrawn at the bottom of the silo and sent to a turbine mixer 7, at a rate of 50 litres per minute.

The turbine mixer consisted of a horizontal metal sheet body, having a horizontal cross-section in the shape of a spiral turn, the space comprised between the ends of the turn serving as a sight hole to watch the operation and to introduce the material to be stirred with the treated particles. Inside said body, a vertical rotating shaft, supported by removable flanges, rotated at about 200 r.p.m.; said shaft carried a series of combs having spaced teeth, arranged so as to stir, disintegrate and whirl the particles fed at one end, and carry them along towards the outlet onto a chute and discharge them on a vibratory screen.

Through the sight-hole of the mixer, a 0.6% sodium alginate solution was uniformly sprayed at the rate of 5 litres per minute. Said solution, owing to its high film-forming degree, completely and uniformly enclosed each sawdust particle.

The draining was effected through a vibrating screen 8 and the material thus treated was discharged into a second silo 9 where it was stored for over 12 hours.

The material was then collected from said second silo, and fed, at the same rate of 50 litres per minute as before, into a second turbine mixer 10 wherein a barium chloride solution of 22° Baumé was sprayed at a rate of 4.25 litres per minute. After draining over a vibratory screen 11, the material was again stored in a silo 12 for completing the chemical reactions.

After a minimum storage period of 24 hours, the sawdust was again withdrawn at a regular rate of 50 litres per minute and treated in a third turbine mixer 13, similar to the previous ones, wherein an artificial Portland slag cement (C.P.A.L., 225/350, French Standard) was sprayed dry at a rate of 3.75 litres per minute. The sawdust was thus perfectly coated with a fine layer of powdered cement, which caused it to slightly dry on the surface.

The sawdust thus treated was then discharged by a chute onto a vibratory belt 14 and hencefrom into a recovery vat, wherefrom it was transferred by an elevator to a storage silo 15 having a capacity of 60 cubic meters, where it remained for a period of at least 48 hours: during this storage, a very substantial temperature rise occurred (15 to 30° C.) the cement setting at the surface of each sawdust particle, the apparent humidity of which was considerably reduced.

After storage in said silo, the treated sawdust could be used as an aggregate. A longer storage, either in the silo, or in the open air under a covered shed, or in bags, promoted the improvement of the quality of the product.

Generally speaking, it may be noted that the apparent volume of the initially treated mass had not substantially increased by more than a volume corresponding to that of the powdered cement used during the last step of the process.

What is claimed is:

1. A process for treating a fibrous cellulosic material comprising:

treating the cellulosic material with an aqueous solution of iron sulfate in an amount and concentration sufficient to impregnate said cellulosic material with said iron sulfate solution; treating said impregnated cellulosic material with a material of the group consisting of alginic acid and alginates in an amount sufficient to coat the fibers of said impregnated cellulosic material, and incorporating in said impregnated cellulosic material, an aqueous solution of a water-soluble salt of a metal of the group consisting of calcium, barium and strontium in an amount sufficient to further impregnate the fibers of said impregnated and coated cellulosic material, and to react with said iron sulfate to thereby produce the insoluble sulfate of said metal and fix said metal salt onto said fibers.

2. A process according to claim 1, wherein said cellulosic material after said first impregnation is allowed to stand before subsequent treatment for a period of time ranging from a few hours to several days.

3. A process according to claim 1, wherein said water-soluble salt is a barium salt.

4. A process according to claim 3, wherein said alginate coating is effected with powdered alginic acid.

5. A process for treating a fibrous cellulosic material comprising:

treating the cellulosic material with an aqueous solution of iron sulfate in an amount and concentration sufficient to impregnate said cellulosic material with said iron sulfate solution; thereafter draining excess unabsorbed solution from the fibers; then treating said impregnated cellulosic material with a material of the group consisting of alginic acid and alginates in an amount sufficient to coat the fibers of said impregnated cellulosic material; thereafter removing from said impregnated and coated cellulosic material water rejected thereby; thereafter adding an aqueous solution of a salt of a metal of the group consisting of calcium, barium and strontium in an amount sufficient to further impregnate the fibers of said impregnated and coated cellulosic material and to react with said iron sulfate to thereby produce the insoluble sulfate of said metal and fix said metal salt onto said fibers; and thereafter separating the residual liquid from the treated cellulosic fibrous mass.

6. A process according to claim 5, wherein said soluble metallic salt is a salt of barium.

7. A process according to claim 5, wherein said impregnation with iron sulfate is effected at a temperature between about 70° and about 100° C., during a period of time between about 45 and 150 minutes.

8. A process according to claim 5, wherein the concentration of the aqueous iron sulfate solution is between about 0.25 and about 10%.

9. A process according to claim 8, wherein the concentration of said iron sulfate solution is between about 0.5 and about 4%.

10. A process according to claim 5, wherein said cellulosic fibrous mass after removal of said residual liquid is mixed with powdered cement in the amount of about one-tenth to about one-fiftieth by volume of said fibrous cellulosic mass, thereby to coat said fibers with said cement.

11. A composition consisting essentially of cellulosic fibers impregnated with a sulfate of a metal of the group consisting of barium, calcium and strontium and with decomposition products of iron sulfate, said fibers having a coating comprising a material of the group consisting of alginic acid and alginates, said composition being suitable for making concrete by mixing with cement.

12. A composition as described in claim 11 in which said sulfate is barium sulfate.

13. The composition of claim 12 wherein said impregnated and coated fibers have a continuous film of cement on the surface, said cement being present in the ratio of about one-tenth to about one-fiftieth by volume of said impregnated and coated cellulosic fibrous material.

14. Concrete prepared by mixing the composition described in claim 11 with cement and water.

References Cited by the Examiner

UNITED STATES PATENTS

| | | | |
|---|---|---|---|
| 1,583,713 | 5/1926 | Garrow | 106—93 |
| 2,539,904 | 1/1951 | Hansen | 106—93 |
| 2,592,345 | 4/1952 | Schnell et al. | 106—115 |

FOREIGN PATENTS

| | | |
|---|---|---|
| 244,178 | 12/1925 | Great Britain. |
| 269,845 | 9/1927 | Great Britain. |
| 278,788 | 10/1927 | Great Britain. |
| 443,334 | 2/1936 | Great Britain. |
| 444,630 | 3/1936 | Great Britain. |
| 455,571 | 10/1936 | Great Britain. |

TOBIAS E. LEVOW, *Primary Examiner.*

S. E. MOTT, *Assistant Examiner.*